United States Patent
Adams et al.

[11] Patent Number: 6,124,878
[45] Date of Patent: Sep. 26, 2000

[54] OPTIMUM BANDWIDTH UTILIZATION IN A SHARED CABLE SYSTEM DATA CHANNEL

[75] Inventors: Michael Brian Adams, Castle Rock; Louis Dew Williamson, Denver, both of Colo.

[73] Assignee: Time Warner Cable, a division of Time Warner Enterainment Company, L.P., Stamford, Conn.

[21] Appl. No.: 08/771,034

[22] Filed: Dec. 20, 1996

[51] Int. Cl.[7] ............................... H04N 7/10; H04N 7/04
[52] U.S. Cl. ................................. 348/10; 348/6; 348/12; 348/17; 348/7; 370/468; 370/229; 370/412
[58] Field of Search ................. 348/6, 7, 10, 12, 348/13, 17, 384, 385, 387; 455/5.1, 4.2; 370/375, 468, 229–235, 412–418, 395; 395/876, 877, 200.47, 200.38; 364/239.1, 239.6

[56] References Cited

U.S. PATENT DOCUMENTS

| | | | |
|---|---|---|---|
| 4,763,317 | 8/1988 | Lehman et al. | 370/358 |
| 4,849,968 | 7/1989 | Turner | 370/232 |
| 4,891,694 | 1/1990 | Way | 348/7 |
| 5,093,718 | 3/1992 | Hoarty et al. | |
| 5,148,272 | 9/1992 | Acampora et al. | 348/397 |
| 5,150,358 | 9/1992 | Punj et al. | 370/418 |
| 5,164,939 | 11/1992 | Shobatake | 370/146 |
| 5,227,876 | 7/1993 | Cucchi et al. | 370/235 |
| 5,231,633 | 7/1993 | Hluchyj et al. | 370/418 |
| 5,301,333 | 4/1994 | Lee | 370/416 |
| 5,361,091 | 11/1994 | Hoarty et al. | |
| 5,412,720 | 5/1995 | Hoarty . | |
| 5,517,495 | 5/1996 | Lund et al. | 370/414 |
| 5,519,701 | 5/1996 | Colmant et al. | 370/60 |
| 5,557,316 | 9/1996 | Haoarty et al. | 348/7 |
| 5,570,355 | 10/1996 | Dail et al. | 370/352 |
| 5,614,955 | 3/1997 | Rackman | 348/6 |
| 5,619,502 | 4/1997 | Kahn et al. | 370/397 |
| 5,623,668 | 4/1997 | Nieuwenhuizen | 395/670 |
| 5,663,962 | 9/1997 | Caire et al. | 395/877 |
| 5,712,992 | 1/1998 | Hawkins et al. | 395/877 |
| 5,721,815 | 2/1998 | Ottesen et al. | 395/200.09 |
| 5,748,629 | 5/1998 | Caldara et al. | 370/389 |
| 5,757,771 | 5/1998 | Li et al. | 370/235 |
| 5,771,350 | 6/1998 | Kim | 395/200.8 |
| 5,771,356 | 6/1998 | Leger et al. | 395/200.63 |
| 5,774,453 | 6/1998 | Fukano et al. | 370/231 |
| 5,828,653 | 10/1998 | Goss | 370/230 |
| 5,896,371 | 4/1999 | Kobayashi et al. | 370/232 |

*Primary Examiner*—Andrew I. Faile
*Assistant Examiner*—Reuben M. Brown
*Attorney, Agent, or Firm*—Robert G. Crouch; Holland & Hart LLP

[57] ABSTRACT

A full service network (FSN) provides three communication channels that extend between a headend and each set-top within the FSN, namely (1) forward-application-transport (FAT) channels that supply data from the headend to all or to only addressed ones of the set-tops, (2) a forward-data-channel (FDC) that supplies data from the headend to all or to only addressed set-tops, and (3) a reverse-data-channel (RDC) that supplies data from the set-tops to the headend. The FDC carries eight types of traffic, namely (1) conditional access message; (2) entitlement management messages; (3) broadcast data; (4) network management services messages or information; (5) general massaging; (6) application downloading; (7) Internet Protocol external device data services, and (8) VBR downloading. A fixed bandwidth FDC provides a first bandwidth portion for the high priority transmission of items (1), (2) and (3) at a continuous bit rate (CBR). All other items are transmitted over the FDC using at an available bit rate (ABR). A priority system for the selective transmission of these other items is based upon (1) how full a data buffer for an item is, as compared to a fullness reference, (2) how old the oldest data in the data buffer for the item is, as compared to an age reference. The fullness reference and the age reference are usually different for each of these other data items.

2 Claims, 7 Drawing Sheets

FIG. 1

OSI STACK 14

| APPLICATION LINK | — 21 |
| --- | --- |
| PRESENTATION LINK | — 20 |
| SESSION LINK | — 19 |
| TRANSPORT LINK | — 18 |
| NETWORK LINK | — 17 |
| DATA LINK | — 16 |
| PHYSICAL LINK | — 15 |

*FIG.2*

FDC 26

| | TRAFFIC TYPE | AVERAGE RATE | BURST RATE |
| --- | --- | --- | --- |
| 40 | CONDITIONAL ACCESS | 20 Kbps | 20 Kbps |
| 41 | ENTITLEMENT MANAGEMENT MESSAGES | 50 Kbps | 50 Kbps |
| 42 | BROADCAST DATA | 20 Kbps | 100 Kbps |
| 43 | NETWORK MANAGEMENT SYSTEM | 20 Kbps | 50 Kbps |
| 44 | GENERAL MESSAGING | 10 Kbps PER USER | 50 Kbps PER USER |
| 45 | APPLICATION DOWNLOADING | 10 Kbps PER USER | 2 Mbps PER USER |
| 46 | EXTERNAL DATA SERVICES | 200 Kbps PER USER | 1.5 Mbps PER USER |
| 47 | VBR DOWNLOADING | 10 Kbps PER USER | 2 Mbps PER USER |

| Ba | Bf | AGE STATE 122 | FULLNESS STATE 125 | ROUND-ROBIN STATE 120 |
|---|---|---|---|---|
| 0 | 0 |  |  | X |
| 0 | 1 |  | X |  |
| 1 | 0 | X |  |  |
| 1 | 1 | X | X |  |

FIG. 11

OPTIMUM BANDWIDTH UTILIZATION IN A SHARED CABLE SYSTEM DATA CHANNEL

CROSS-REFERENCE TO RELATED APPLICATIONS

Co-pending, commonly assigned patent applications: Attorney Docket Nos. 166712002400 entitled METHOD AND APPARATUS FOR UTILIZING THE AVAILABLE BIT RATE IN A CONSTRAINED VARIABLE BIT RATE CHANNEL filed Dec. 14, 1995, which is directed to receiving an encoded information stream having a variable bit rate, and controlling the rate of transmission so that the variable bit rate is transformed into a constrained variable bit rate; 96-05/38295.830004.000 entitled CABLE SYSTEM SET-TOP TERMINAL HAVING IP ROUTING CAPABILITY, which is directed to utilizing the IP routing capability of a set-top to enable the set-top to support two-way communication between (1) a PC or similar data device that is connected to the set-top, and (2) the Internet that is connected to the headend filed concurrently herewith and all incorporated herein by reference..

BACKGROUND OF THE INVENTION

1. Field of the Invention

The present invention relates to the field of interactive multimedia communication networks, also called Full Service Networks (FSN). More specifically, the present inventions relates to apparatus/methods for insuring full utilization of a communication channel bandwidth when sending information from a cable system's headend to a plurality of set-top terminals.

2. Description of the Related Art

An early commercial installation by the Warmer Communications Company, under the brand name QUBE, provided an interactive TV cable system.

Interactive multimedia communication networks are generally known in the patent art. U.S. Pat. No. 5,093,718 to Hoarty et al, U.S. Pat. No. 5,412,720 to Hoarty, and U.S. Pat. No. 5,361,091 to Hoarty et al, all of which are incorporated herein by reference, are examples.

While the television art was initially a one-way communication art, recent developments have moved this art into the field of interactive services and applications wherein a TV set and its accompanying apparatus, such as a set-top terminal, have become interactive devices. The user can now exercise control over what is viewed on the TV, and how the selected programs are viewed. In addition, above-mentioned, copending patent application filed concurrently herewith and entitled CABLE SYSTEM SET-TOP TERMINAL HAVING IP ROUTING CAPABILITY allows a user to connect an external device, such as a personal computer (PC), to the set-top, and then communicate with a WAN network such as the Internet, or a similar WAN data link, by way of the OSI-IP protocol that is supported by the set-top.

With the advent of such advanced interactive techniques, also called a Full Service Network (FSN), the set-tops enable a cable TV system to be used for the reception of broadcast video, on-demand video, and two-way point-to-point, or set-top to set-top, communication on the Internet, etc.

In the point-to-point environment, a connection is established to the FSN's headend that includes a data vault, or a connection is established to the Internet at the headend. This connection is dedicated to the requesting user. When multiple users simultaneously engage in point-to-point activity, the resources of the FSN must be designed to support this multiple use.

One of the most critical resources of the FSN in supporting these one-way and two-way communication sessions between a headend and a multitude of set-tops that are located at the residences of multiple users is the bandwidth of the communications channel, or groups of channels, that connect the headend to the set-tops. Bandwidth must be allocated in order to provide the best service to the greatest possible number of users. In the traditional analog TV broadcast environment, the bandwidth is divided into multiple 6 MHz channels, with each channel having its own program or application. In the digital environment, one 6 MHz channel can be sliced or divided into multiple transmission pipes, with each pipe carrying a different program or application.

There are three basic ways to deliver digital data; i.e., Continuous-Bit-Rate (CBR), Variable-Bit-Rate (VBR), and Available-Bit-Rate (ABR). CBR is relatively intolerant to variability in the delay of the output signal, since a delay usually reduces the quality of the transmission to an unacceptable level.

With CBR, the user is guaranteed a high quality of service. However, when a point in time occurs during which the bandwidth is not fully utilized, for example as a result of data compression, available bandwidth is wasted.

In VBR, the transmission rate usually varies with time. Variations of VBR are available, unconstrained and constrained. Unconstrained VBR uses a large bandwidth, an example being the transmission of MPEG-2 compress data. Unconstrained MPEG-2 transmission provides a maximum quality transmission, but-at the cost of a large bandwidth that may be difficult to implement in the FSN. Constrained VBR simply puts a cap or maximum on the allowable bit rate, the cap usually being equivalent to CBR.

ABR is a service whose bit rate varies as a function of the unused bandwidth that is available at any given instance in time. ABR cannot be used in the FSN for time-critical data, such as conditional-access (CA) messages and entitlement-management-messages (EMMs). Other data, such as the above mentioned data that is less sensitive to transmission time delay from the headend to a set-top, can however be transmitted using ABR.

Above-mentioned copending patent application entitled METHOD AND APPARATUS FOR UTILIZING THE AVAILABLE BIT RATE IN A CONSTRAINED VARIABLE BIT RATE CHANNEL provides for the transmission of high-priority video data and lower-priority application data, wherein the high-priority data is transmitted at VBR, and the low-priority data is transmitted at ABR. More specifically, a selector operates to give video data a higher transmission priority than is given application data. An encoder supplies compressed VBR video data to an encoder buffer, and an encoder transmission processor reads data from the encoder buffer. A channel-rate-control circuit monitors the state of fullness of the encoder buffer with reference to a buffer fullness threshold. When the buffer fullness is less than the threshold, the encoder transmission processor is instructed to decrease the rate at which data is read from the buffer. When the state of buffer fullness later reaches the threshold, the encoder transmission processor is instructed to increase the rate at which data is read from the buffer. If, however, the buffer remains relatively full, even after the rate of the encoder transmission processor has been increased to a predetermined maximum channel rate, then the channel rate control circuit instructs the encoder to decrease the rate at which it outputs compressed data to the buffer. In this manner, the bit rate of the encoder varies in a manner not to exceed the maximum rate of the encoder transmission processor. The structure and arrangement of this copending patent application provides that the data-rate-space that at any time exists or is available between (1) the data rate at which the encoder transmission processor is operating, and (2) the maximum channel rate or maximum rate of the encoder transmission processor, is used to send the lower priority data at an ABR, wherein the magnitude of the ABR is determined by the magnitude of this data-rate-space.

The present invention generally relates to this above described copending patent application. However, the present invention provides an apparatus/method for using the bandwidth of the FSN's out-of-band (OOB) forward-control-channel (FDC), first for the CBR delivery of high priority, and then the left-over or residual bandwidth of the FDC is used for the lower priority delivery of other FSN information at an ABR.

SUMMARY OF THE INVENTION

The architecture of a FSN defines three general types of communication channels that extend between a headend and each set-top that is within the FSN. These three types of channels are (1) a number of one-way Forward-Application-Transport (FAT) channels that are used to supply data from the headend to one or more set-tops, (2) a one-way Forward-Data-Channel (FDC) that is used to supply data from the headend to one or more set-tops, and (3) a number of one-way Reverse-Data-Channel (RDC) that supply data from the set-tops to the headend.

All of these channels are shared by the set-tops within the FSN. A set-top can select any FAT channel simply by tuning the set-top to the selected FAT channel. Each set-top is at all times tuned to the FDC, even while a set-top is receiving data on a FAT channel. A given set-top can transmit only on one RDC.

The FDC carries all Out-Of-Band (OOB) traffic to a given set-top, including Internet protocol (IP) datagrams that support a wide range of flexible and standard data communications protocols.

The FDC of the following example of the present invention carries eight types of traffic: (1) conditional access message relating to data that is transmitted on the FAT channel; (2) entitlement management messages (EMMs) relative to data that a set-top is entitled to receive; (3) broadcast data; (4) network management services or information; (5) general massaging; (6) application downloading to one or more set-tops; (7) external device data services enabling the Internet to communicate with a PC that is connected to an external Ethernet port of a set-top; and (8) VBR downloading.

A FSN operator allocates a high-priority fixed bandwidth portion of the FDC for the CBR transmission of items (1), (2) and (3). The other items (4)–(7) are then transmitted over the FDC at a lower priority ABR. In this way, when the high-priority items are totally or somewhat quiescent, the lower-priority items are able to use whatever bandwidth remains in the FDC.

The present invention provides an apparatus/method for using a maximum amount of the bandwidth of the FSN's out-of-band forward-control-channel (FDC), first for the CBR delivery of the highest priority CA data, NMS information, and EMMs. Thereafter, the residual or left over bandwidth of the FEC is used for the ABR delivery of other FSN information. Example is OSI-IP PC data that is sent between a set-top and the Internet, application downloading from the headend to the set-top, and VBR downloading.

An object of this invention is to provide optimum bandwidth utilization in a TV cable system's shared forward data channel. In this construction and arrangement, a full service cable network provides forward-application-transport channels that supply data from the cable system's headend to the system set-tops, a forward-data-channel that supplies data from the headend to the set-tops, and a reverse-data-channel that supplies data from the set-tops to the headend. The forward-data-channel carries a quantity X of high priority traffic, and a plurality Y of lower priority traffic. A fixed bandwidth of the forward-data-channel is assigned for the high priority transmission of the X traffic items at a continuous bit rate. All of the Y traffic items are transmitted over the remaining bandwidth of the forward-data-channel at an available bit rate. A priority system for selective transmitting the Y traffic items is based upon how full a data buffer for a Y item is, as compared to a fullness reference for that Y item, and how old the oldest data in a Y traffic item data buffer is, as compared to an age reference for that Y item. The fullness reference and the age reference are usually different for each of the Y traffic items. An operator at the headend sets or selects these reference values in order to achieved a desired priority ranging among the various Y traffic items.

These and other objects, advantages and feature of this invention will be apparent to those of skill in the art upon reference to the following detailed description, which description makes reference to the drawing.

DESCRIPTION OF THE PREFERRED EMBODIMENT

Figure 1:
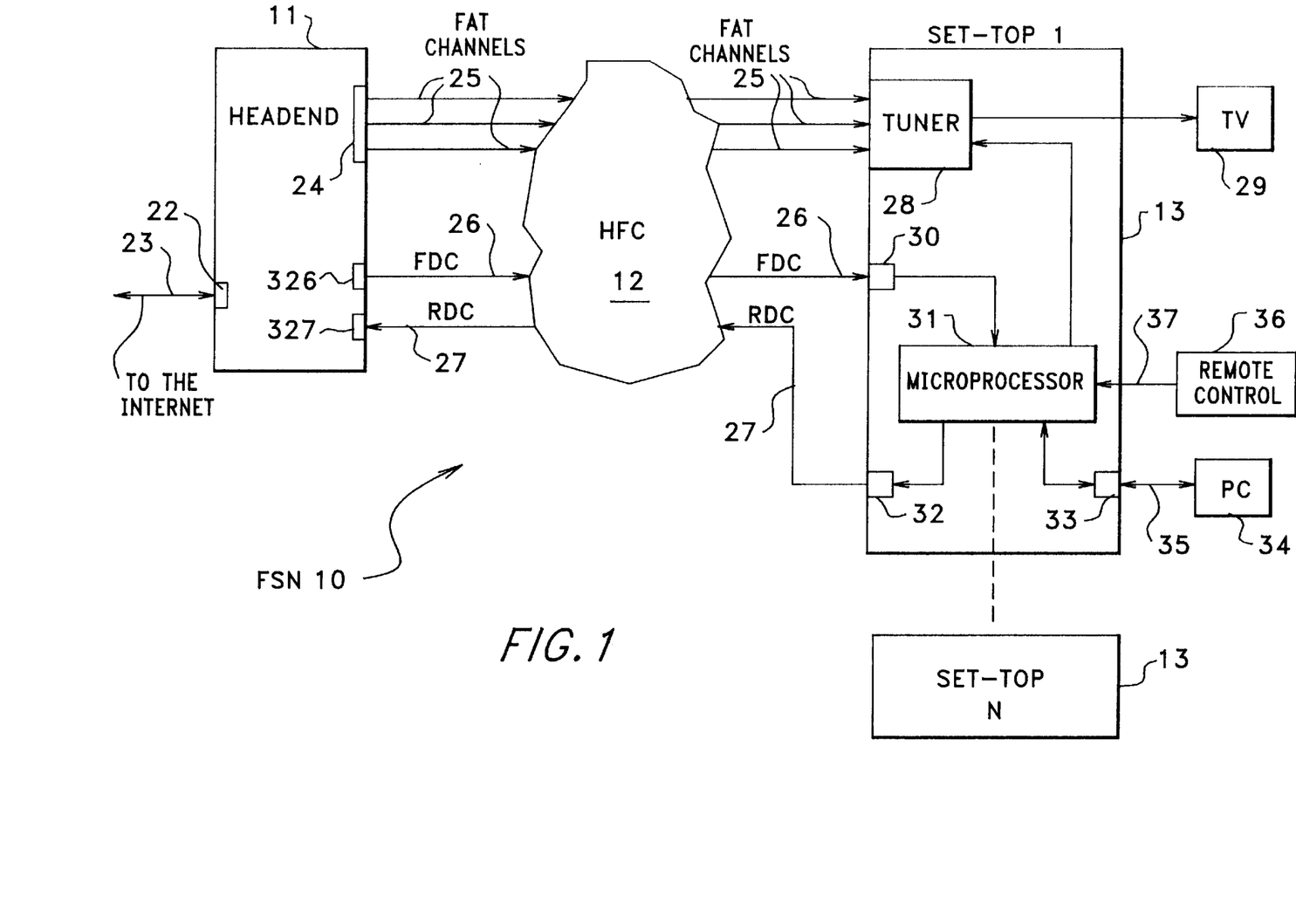
FIG. 1 shows an on-demand interactive multimedia communication network, also known as a Full-Service-Network (FSN), that includes the present invention.

FIG. 1 shows an on-demand interactive multimedia communication network 10, also known as a Full-Service-Network (FSN), that includes the present invention. The major components of FSN 10 are a cable system headend 11, a hybrid-fiber-coaxial cable (HFC) network 12, and a large number N of individual set-top terminals 13 that are located, usually one set top 13 at the home or physical location of each user or subscriber within FSN 10. As is well known, headend 11 contains a large variety of apparatus and functions, including a data/video vault, and an OSI hardware/software/logic stack.

Figure 2:
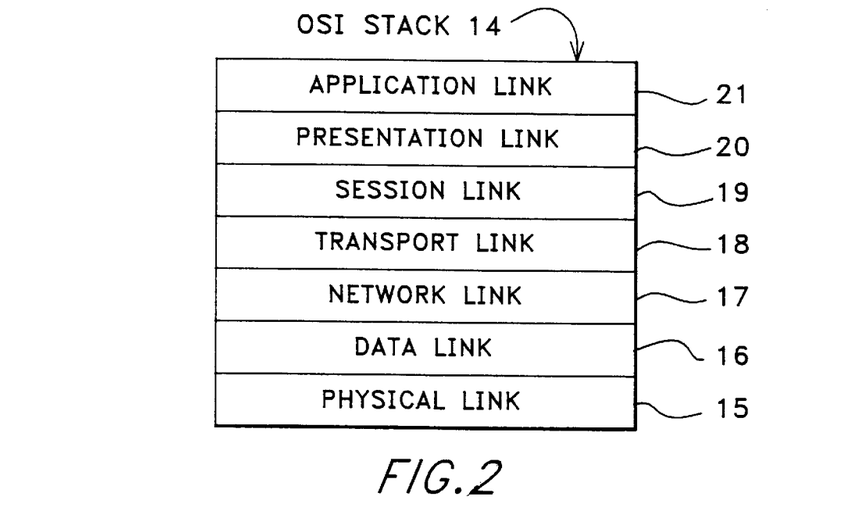
FIG. 2 is an example of an open systems interconnection (OSI) hardware/software/logic stack that is used throughout the FSN of FIG. 1.

An example of an open systems interconnection (OSI) hardware/software/logic stack 14 is shown in FIG. 2. OSI stack 14 includes or defines seven software/hardware/logic layers. These seven layers define the activities that must or may take place when devices communicate on a network. OSI stack 14 includes seven different layers, i.e. (1) level-1, a physical-link 15, (2) level-2, a data-link 16 that supports an Asynchronous-Transfer-Mode (ATM) network that is within FSN 10, as will be described, (3) level-3, a network link 17, (4) level-4, a transport link 18, (5) level-5, a sessions link 19, (6) level-6, a presentation link 20, and (7) level-7, an application link 21.

While headend 11 may take a large variety of forms, as is well known to those of skill in the art, it suffices to say that in accordance with the present invention, headend 11 includes at least one port 22 by which headend 11 is enabled to communicate with a WAN such as the Internet by way of a data connection or channel 23. As will be appreciated by those of skill in the art, port 22 and channel 23 may comprise any of a number of well known technologies, including SONET and asynchronous-transfer-mode (ATM)

In addition, headend 11 includes transmitters 24 that transmit to HFC 12 by way of forward-application-(FAT) channels 25, a transmitter 326 that transmit to HFC 12 by way of a forward-data-channel (FDC) 26, and a receiver that receives from HFC by way of a reverse-data-channel (RDC) 327.

Each set-top 13 within FSN 10 includes a tuner 28 that selectively enables one video signal to be selected from FAT 25 for application to that set-top's TV set 29, a receiver 30 that receives signals from FDC 26 and applies them to microprocessor 31, a transmitter 32 that receives signals from microprocessor 31 and applies them to RDC 27, and an external port 33 that is adapted to receive/transmit signals from/to microprocessor 31 relative to an external data device, such as personal computer (PC), 34 by way of a LAN link 35. Port 33 and link 35 may comprise an Ethernet port/link, or an equivalent LAN technology such as P.1394 or USB. In addition, PC 34 may comprise/include any of a large variety of well known devices. Examples include, game controllers, printers, and home control systems.

As is well known, each set-top 13 is usually provided with a remote control 36 that enables the user/subscriber to control the various functions of a set-top 13 by way of a data link 37 that may comprise an RF connection, an IR connection, or a hard wired connection.

Headend 11 provides a one-way analog/digital link to each set-top 13 by way of FAT 25; for example, analog NTSC video and audio, as well as 6 MHz in-band, compressed MPEG-2 (the ISO-IEC international standard for the transport of compressed digital media, both video and audio).

Three documents that describe MPEG, and are included herein by reference, are (1) ISO-IEC IS 13818-1, International Standard (1994), MPEG-2-Systems, (2) ISO-IEC IS 13818-2, International Standard (1994), MPEG-2-Video, and (3) ISO-IEC CD 13818-4, MPER Committee Draft (1994), MPEG-2 Compliance.

Each of the set-tops 13 is connected to headend 11 by way of digital FDC 26 and digital RDC 27. Each set-top 13 is assigned to an addressable FDC 26, and this FDC 26 is the primary data path to the addressed set-top 13 by which set-top 13 receives most of its instructions from headend 11. For example, FDC 26 is a modulated data channel carried from headend 11 to each of the set-tops 13 at a rate of about 1.5 to about 8.0 Mbps.

Figure 3:
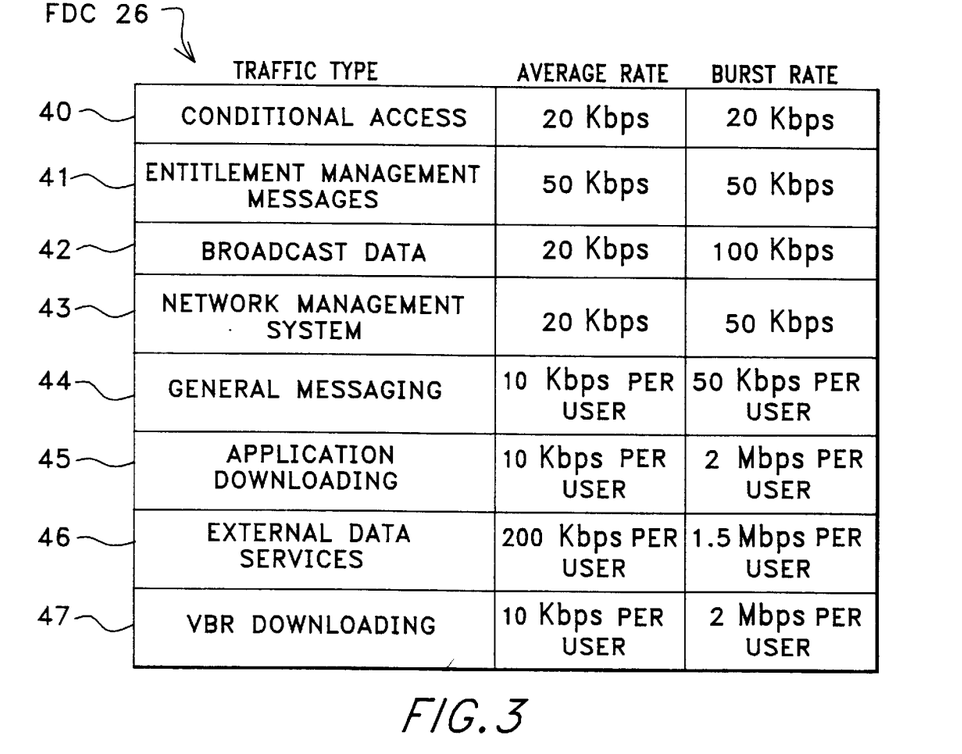
FIG. 3 is an example of eight different data traffic, items or signals that may be carried by the forward data channel (FDC) of FIG. 1.

FIG. 3 shows an example of eight signals, eight traffic items, or eight data items that may be carried by FDC 26 to set-tops 13. As shown in FIG. 3, FDC 26 may carry traffic 40 for conditional access of a set-top 13 to signals that are on FAT 25, traffic 41 that comprises entitlement management messages for signals that are on FAT 25, traffic 42 for broadcast data, traffic 43 for network management, traffic 44 for general massaging, traffic 45 for application downloading to set-tops 13, traffic 46 enabling the servicing of external device data services such as data services for PC 34, and traffic 47 for Variable Bit Rate (VBR) downloading to a set-top 13. FIG. 3 also shows examples of the average bit rate and the burst bit rate for these eight types of traffic 44–47 by way of FAT 25.

By way of example, traffic 40–42 is sent on FDC 26 by way of CBR, and all of the other traffic 43–47 is sent ABR. By way of example, traffic 40 and 41 relates to granting access to an addressed set-top 13 to receive special programs, for example pay-per-view, traffic 44 relates to messages that are to be displayed on a user's TV 29, traffic 46 is data that is received from the Internet in response to a request by a PC 34, and traffic 47 may, for example, relate to the downloading of movie clips to set-tops 13. VBR downloading traffic 47 is sent from headend 11 by way of an TCP-IP window control algorithm.

RDC 27 is a modulated data channel that is carried from each set-top 13 to headend 11 at a rate of about 1.5 to about 2.0 Mbps, wherein RDC 27 may carry traffic for massaging, external device data services, and network management.

Above-described set-tops 13 are proprietary devices, and all communication between set-tops 13 and headend 11 is handled by a layered protocol such as the OSI standard of FIG. 2. Internet-protocol (IP) is used for handling all digital communications. Each individual set-top 13 has its own unique IP address, and these IP addresses are used in order to establish point-to-point communications between a specific set-top 13 and headend 11, as well as between two different set-tops 13.

FAT 25 carries, for example, digital MPEG-2 compressed and multiplexed video and audio data that is sent to all set-tops 13, application data to be down loaded to an addressed set-top 13, entitlement control messages that are directed to an addressed set-top 13, and analog broadcast data that is sent to all set-tops 13.

FDC 26 carries all Out-Of-Band (OOB) traffic, as IP datagrams, to an addressed set-top 13. For example, the data/messages shown in FIG. 3 are sent either to all set-tops 13, or only to an addressed set-top 13. FDC 26 also carries external device data services 46 of FIG. 3 from headend 11 and the headend's WAN Internet port 22 to an addressed set-top 13, and then to that set-top's LAN Ethernet port 33.

RDC 27 carries all traffic from a set-top 13 to headend 11. For example, the data/messages network management information and general messaging are sent by an addressable set-top 13 to headend 11. RDC 27 also carries external device data services from the Ethernet port 33 of an addressable set-top 14 to the Internet port 22 of headend unit 11, and thereby to the Internet.

Figure 4:
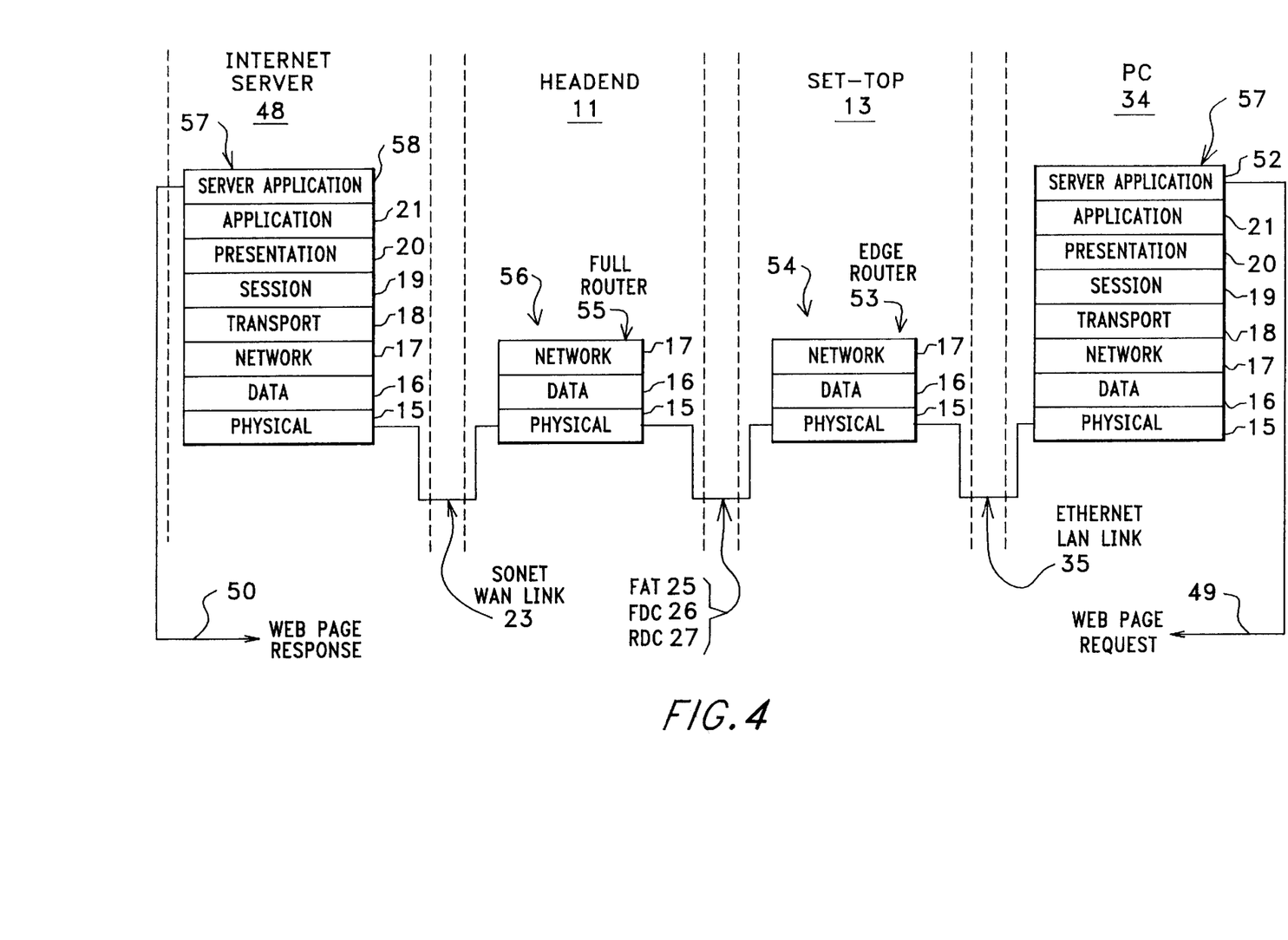
FIG. 4 depicts the use of FIG. 2's OSI stack within the FSN of FIG. 1 wherein it is assumed that a PC originates a web page request, and that as a result of this request, an internet server responds with a web page response.

FIG. 4 depicts the use of FIG. 2's OSI stack 14 within FSN 10. In this figure, it will be assumed that PC 34 originates a web page request 49, and that as a result of this request 49, an internet server 48 responds with a web page response 50. FIG. 4 shows items 49,50 as separate items, but of course, this request 49 and the response 50 actually are transmitted on FIG. 4's link 35 and link 23, respectively.

As seen in FIG. 4, the OSI stack 51 that is within PC 34 includes a level-8, client application 52. This level of OSI stack 51 originates the above-described web page request 49. While request 49 is actually sent to set-top 16 by way of the PC's physical link 15 and Ethernet link 35, request 49 is shown in FIG. 4 as a separate link for purposes of simplicity.

In order to implement the present invention, each set-top 13 within FSN 10 includes an edge router 54 whose function is implemented by an OSI stack 53 that includes at least a physical link 15, a data link 16, and a network link 17. In addition, headend 11 includes a full router 55 whose function is implemented by an OSI stack 56 that includes at least a physical link 15, a data link 16, and a network link 17.

In order for the PC's request 49 to be answered, FIG. 4 shows headend 11 connected to an Internet server 48. Internet server 48 includes an OSI stack 57 having a level-8, server application 58. This level-8 of OSI stack 57 originates the above described web page response 50. While response 50 is actually sent to PC 34 by way of the server's physical link 15 and SONET link 23, response 50 is shown in FIG. 4 as a separate link for purposes of simplicity.

Note that in the above description physical link 15 that is within OSI stacks 51,54,56,57 is the means whereby communication actually takes place between a PC 34 and headend 11.

Figure 5:
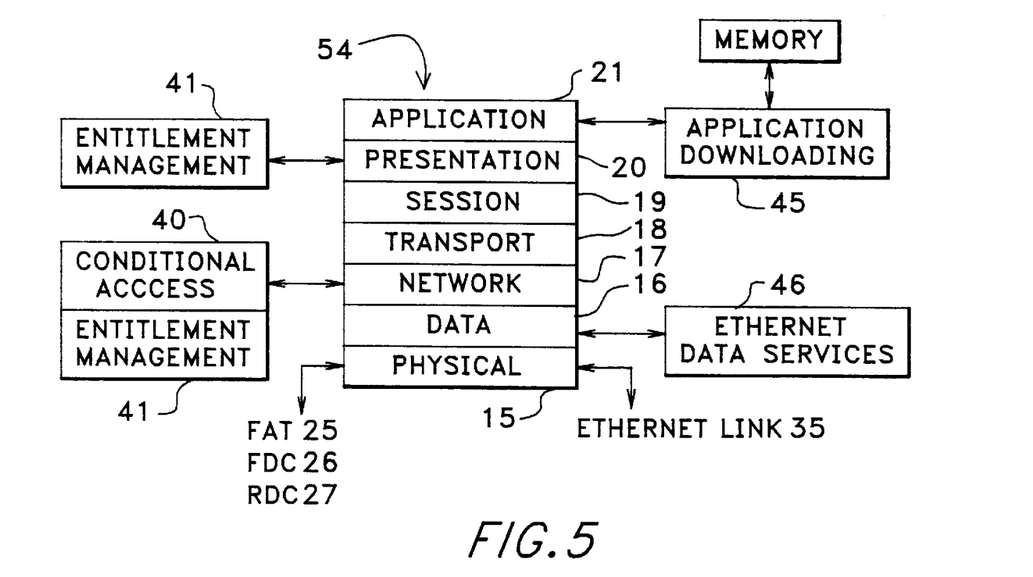
FIG. 5 is a more complete showing of the OSI stack that is within each set-top. As shown, the set-top OSI stack may be equivalent to the OSI stack FIG. 2.

FIG. 5 is a more complete showing of OSI stack 54 that is within each set-top 13. As shown, OSI stack 54 may be equivalent to OSI stack 14 of FIG. 2.

As was stated previously, FIG. 3 is an example of eight different data traffic or signals that may be carried by FDC 26 to the set-tops 13 of FIG. 1. In FIG. 4, it is shown that these eight signals are handled by various levels of the OSI stack 54 that is within each of the set-tops 13.

For example, FIG. 3 conditional access messages 40 and FIG. 3 entitlement management messages 41 are both handled by OSI level-3 network link 17, FIG. 3 Ethernet data services messages 46 are handled by OSI level-2 data link 16, FIG. 3 application downloading messages 45 are handled by OSI level-7 application link 21, and FIG. 3 entitlement management messages 41 are handled by OSI level-7 presentation link 20.

Figure 6:
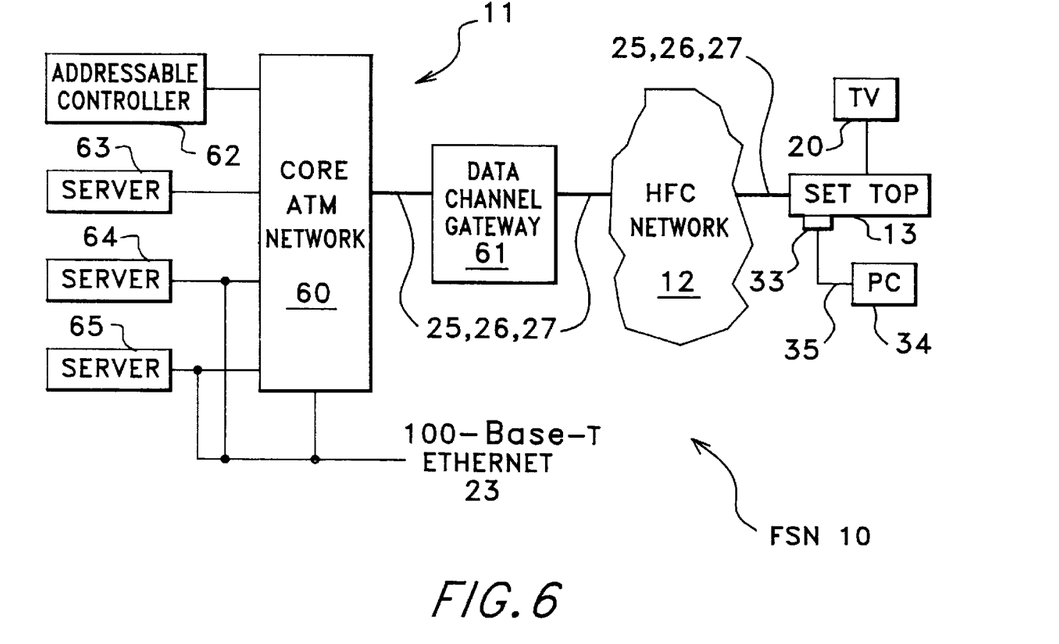
FIG. 6 is a showing of the present invention that is generally similar to FIG. 1, but shows the use of a core Asynchronous-Transfer-Mode (ATM) network and a data channel network, wherein the headend is shown as having an addressable controller, a number of internal servers, and the ATM.

FIG. 6 is a showing of the present invention that is generally similar to FIG. 1, but shows the use of a core Asynchronous-Transfer-Mode (ATM) network 60. One set-top 13 is shown connected to headend 11 by way of HFC 12, a data channel gateway 61, and ATM 60. In FIG. 6, headend 11 is shown as having an addressable controller 62, internal or external servers 63–65, and ATM 60.

Servers 63–65 can be application servers (for example database services), and/or media servers (for example MPEG-2 encoded video and audio servers). Servers 63–65 may be connected with 100-base-T Ethernet 63, and/or with core ATM 60, as is shown in FIG. 6.

ATM 60 is an asynchronous transfer mode network that uses wide area network (WAN) protocol. ATM 60 has high bandwidth, low-delay switching, and multiplexing packet technology that operates on fixed-length byte cells. The primary function of ATM 60 is to establish logic connections between all elements of FSN 10. All data, whether in the forward direction (i.e., a movie to be delivered to a subscriber), or in the reverse direction (i.e., an order that is initiated by a subscriber), passes through ATM 60.

Data channel gateway 61 is external to headend 11 and supports FAT 25, FDC 26 and RDC 27 to set-top(s) 13. Data channel gateway 61 operates to translate from ATM transport to MPEG-2 transport, thus providing a hybrid ATM/MPEG-2 transport network.

Figure 7:
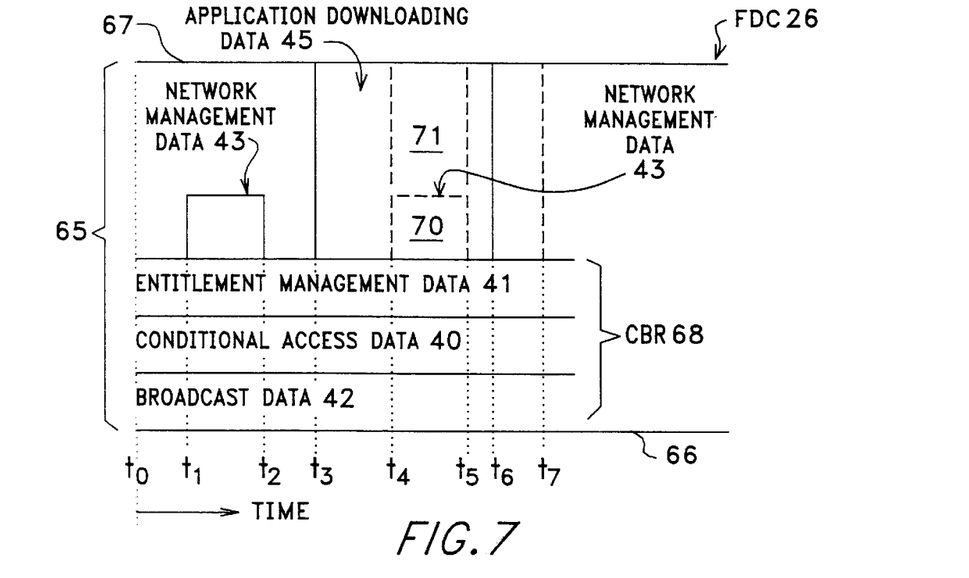
FIG. 7 depicts operation of the present invention wherein a fixed bandwidth pipe or data channel is provided for transmission of the FIG. 3 data items within the FDC of FIG. 1, wherein continuous bit rate (CBR) is used for the transmission of high priority data items, and wherein available bit rate (ABR) is provided for the transmission of low priority data items.

With reference to FIG. 7, this figure depicts operation of the present invention wherein a fixed bandwidth pipe or channel 65, having a fixed bandwidth allocation that extends between a lower frequency 66 and an upper frequency 67, is provided for the transmission of data items 40–47 of FDC 26 shown in FIG. 3. In FIG. 7, the horizontal axis represents increasing time as it progresses to the right, and the vertical axis represents increasing frequency as it progresses upward.

In this example, the three highest-priority data items 40–42 are assigned to transmit at a CBR within bandwidth portion 68. These three highest priority data items are, broadcast data 42, conditional access data 40, and entitlement management message data 41. As will be appreciated, other relevant data on FDC 26 may also be assigned this highest priority if desired. In any event, and as can be seen from FIG. 7, regardless of how high the data traffic of .FDC 26 becomes, these three high priority data items 40–42 will always be serviced.

The present invention operates to ensure that as FIG. 3's data traffic 40–47 increases within FDC 26, the full bandwidth 65 of FDC 26 will be always utilized, as needed, in accordance with (1) the highest priority CBR data items such as 40,41,42 always being granted access to bandwidth portion 68, and (2) the remaining data items 43–47 being serviced or transmitted by FDC 26 in an ABR, based upon a priority that is determined as a function of two factors, namely (a) the quantity of data that is contained in a related data buffer, and (b) the age of the oldest data in the related data buffer, as will be explained.

While not shown in the FIG. 7 example, it is possible in accordance with this invention that at any given time FDC 26 traffic 40–42 will not use all of bandwidth portion 68. In this case, operation of the present invention will use the unused portion of bandwidth 68, as is needed, to service the lower priority traffic 43–47.

In the following example of the operation of the present invention, it is assumed that FIG. 3's broadcast data messages 42, conditional access messages 40, and entitlement management messages 41 all are of this highest priority, and as a result of this high priority these three messages, or this data, is continuously sent at a CBR within the bandwidth portion 68 of FIG. 7 during the time interval from $t_0$ to $t_7$.

It is also assumed that FIG. 3's network management messages or data 43, while being of a lower priority than the three above described messages 40,41,42, is of a higher priority than FIG. 3's application downloading messages 45.

At time to of FIG. 7, the only traffic within FDC 26 is the three highest priority items 40–42, and, as shown, these three highest priority items remain active during the entire time interval that is shown in FIG. 7.

At time $t_1$, network management data traffic 43 appears on FDC 26, and, as shown, data 43 is handled or transmitted at an ABR by FDC 26 without interruption within the time interval $t_1$–$t_2$.

At time $t_3$, FDC 26 receives application downloading data 45, and this data 45 is handled without interruption, and at an ABR, until time $t_4$.

At time $t_4$, a second occurrence of network management data 43 appears on FDC 26. As noted above, data 43 is of a higher priority than data 45. Thus, area 70 of bandwidth 65 is preempted by data 43 at an ABR, and only the remaining area 71 bandwidth 65 remains for use by data 45 at an ABR.

Assume now for the moment that the above described second occurrence 70 of network management data did not in fact occur. As a result, full use of the remaining portion of bandwidth 65 was in fact granted to application downloading data 45, and in this case all of data 45 would have been transmitted at an ABR within the time interval $t_5$–$t_6$.

Returning now to the assumed presence of the second occurrence 70 of data 43 during time interval $t_4$–$t_5$, the inability of data 45 to use the portion 70 of the remaining bandwidth results in the use of a longer time interval $t_3$–$t_7$ for the transmission of data 45 at an ABR.

As a result, and in accordance with the operation of this invention, the more time sensitive network management data 43 is sent at an ABR within time interval $t_4$–$t_5$ while the time interval that it takes to transmit the less time sensitive application downloading data has been extended by the time interval $t_6$–$t_7$.

Figure 8:
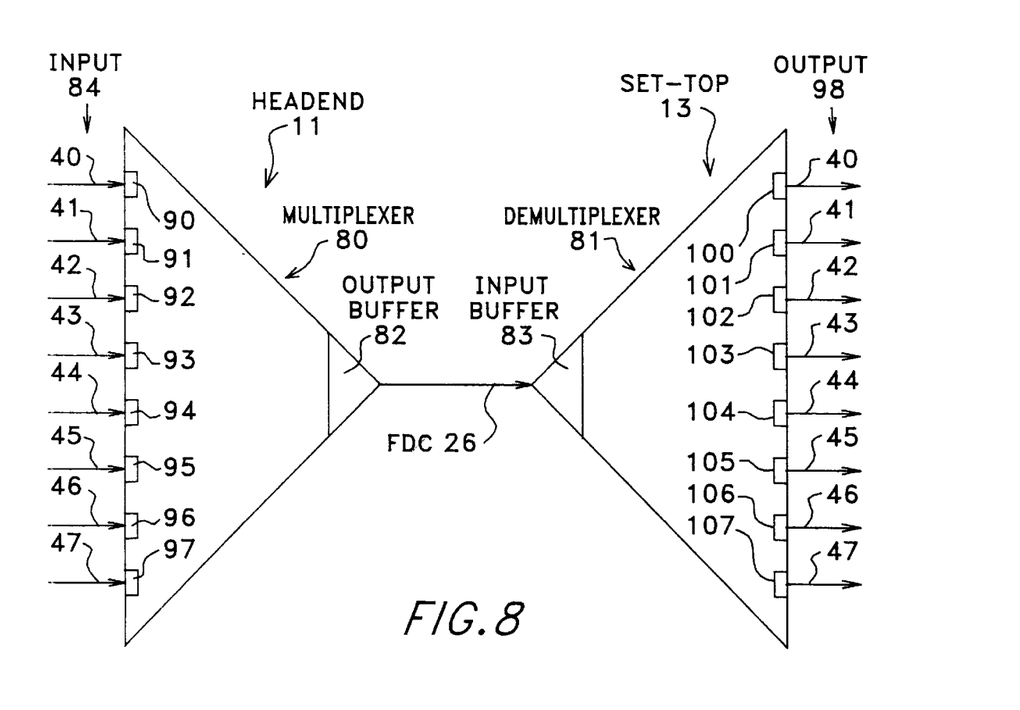
FIG. 8 shows a portion of the ATM of FIG. 6 and of a portion of a set-top that deal with transmitting and then receiving the FDC of FIG. 1.

FIG. 8 is a simplified showing of a portion of the headend's ATM 60, and of a portion of a set-top 13, these two portions dealing with transmitting and then receiving FDC 26.

As shown in FIG. 8, a multiplexer 80 is located at headend 11, and a demultiplexer 81 is located at each of the set-tops 13. Multiplexer 80 includes an output buffer 82, whereas demultiplexer 81 includes an input buffer 83. The portions of headend 11 and a set-top 13 that deal with RDC 27 are generally similar, with the exception that a multiplexer 80 is located at each of the set-tops 13, and a demultiplexer 81 is located at headend 11.

The input 84 of multiplexer 80 comprises eight FIFO buffers 90–97. These eight individual buffers 90–97 received an individual one of the eight data signals 40–47 shown in FIG. 3; i.e., buffer 90 receives conditional access data 40, buffer 91 receives entitlement management message data 41, etc.

With reference to FIG. 3, in an embodiment of this invention the three data items 40–42 comprise data that is the least tolerance of a transmission delay from headend 11 to a set-top 13, the four data items 43–46 comprise data that is progressively more tolerant to a transmission delay from headend 11 to a set-top 13, and data item 47 comprise data that is the most tolerance of a transmission delay from headend 11 to a set-top 13.

A feature of this invention provides that in relation to FDC 26, multiplexer 80 at headend 11 operates to handle the content of an individual buffer 93–97 in accordance with a priority system that is based on (1) the state of fullness of a buffer 93–97, and the age of the oldest data that is in a buffer 93–97. Stated in another way, priority of handling data that is within a buffer 93–97 is based upon the answer to the two questions; How full is the buffer?, and How old is the first-in-data that is in the buffer?.

The output 98 of demultiplexer 81 comprises a similar plurality of eight output buffers 100–107. Each of these eight individual output buffers 100–107 receives its own individual input from FDC 26, and again provides eight individual outputs designated 40–47, wherein each individual output of demultiplexer 82 carries the information as above defined relative to inputs 40–47 of multiplexer 80.

Figure 9:
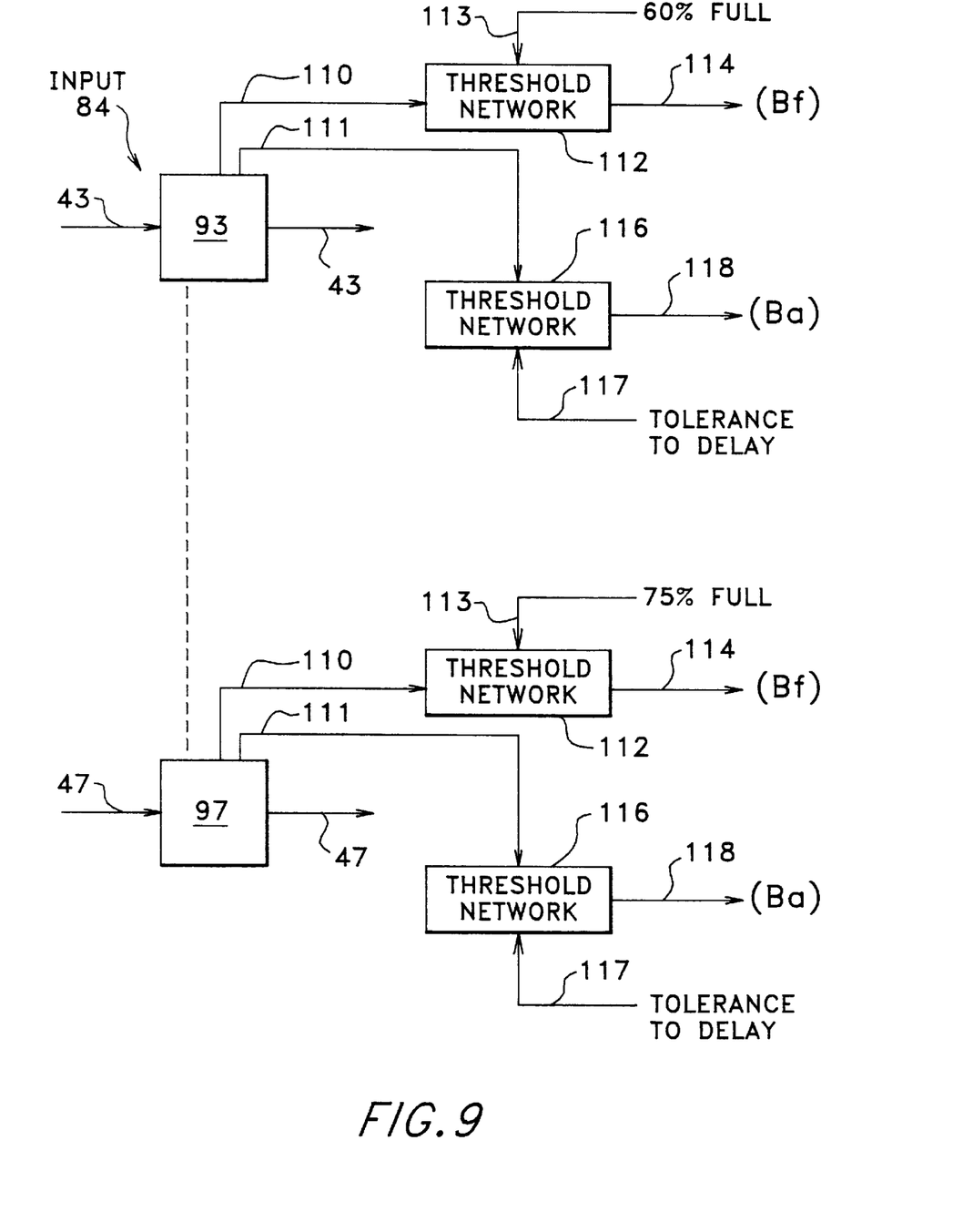
FIG. 9 is another showing of the input of the FIG. 8 multiplexer that comprises a number of FIFO buffers, each of the buffers providing a first output whose signal content comprises the state of fullness of a buffer, and a second output signal whose signal content comprises the age of the oldest data that is in a buffer.

FIG. 9 is another showing of input 84 of FIG. 8's multiplexer 80 that comprises the five FIFO buffers 93–97. Each of the five buffers 93–97 provides a first output 114,Bf whose signal content comprises the state of fullness of a buffer 93–97, and a second output signal 118,Ba whose signal content comprises the age of the oldest data that is in a buffer 93–97.

A first threshold network 112 operates to compare a buffer fullness signal 110 to a threshold signal 113 whose magnitude determines the corresponding buffer's tolerance to being a relatively full buffer. In the example of FIG. 9, buffer 93 that handles the FIG. 3 data item 43 is provided with a 60% full threshold 113, whereas the buffer 97 that handles the FIG. 3 data item 47 is provided with a 75% full threshold 113. Thus, buffer 93 is less tolerant to being somewhat full than is buffer 97.

When threshold 113 is exceeded by the fullness signal 110 that is provided by a buffer 93–97, that buffer's threshold network 112 generates an output signal 114, i.e. signal Bf. For example, output signal 114,Bf comprises a binary number whose magnitude is indicative of the state of fullness 110 of the associated buffer 93–97. As will be appreciated, Bf signal 114 usually includes a hysteresis characteristic; for example, the Bf signal 114 becomes active upon buffer 97 reaching a state of about 75% full, as indicated by signal 110, and the Bf signal remains active until the state of fullness 110 of buffer 97 lowers to about 25% full.

A second threshold network 116 operates to compare a buffer's data age signal 1 11 to a threshold age signal 117 whose magnitude determines that buffer's tolerance to a transmission delay. As stated previously, buffer 93 that handles the FIG. 3 data item 43 is relatively intolerant of a transmission delay, whereas buffer 97 that handles the FIG. 3 data item 47 is relatively tolerant of a transmission delay. As a result the magnitude of the age threshold signal 117 that is supplied for buffer 93 is quite low, whereas the age threshold signal 117 that is supplied for buffer 97 is relatively high.

Output signal 118 from the threshold networks 116, signal Ba, is a binary number that indicates the number of microseconds that the oldest data packet of a FIG. 3 data item has resided in the associated buffer 93–97. As stated above, the FDC data items 43–47 of FIG. 3 are ranked generally in the order of importance or intolerance to a transmission delay.

For example, network management data item 43 is less sensitive to a transmission delay than is VBR downloading data item 47. The extent to which a data item 43–47 is intolerant to a transmission delay is used as the age threshold parameter 117, and a buffer's data age signal 111 is compared to this threshold 117 in order to determine when to generate an age output signal 118 or Ba.

Figure 10:
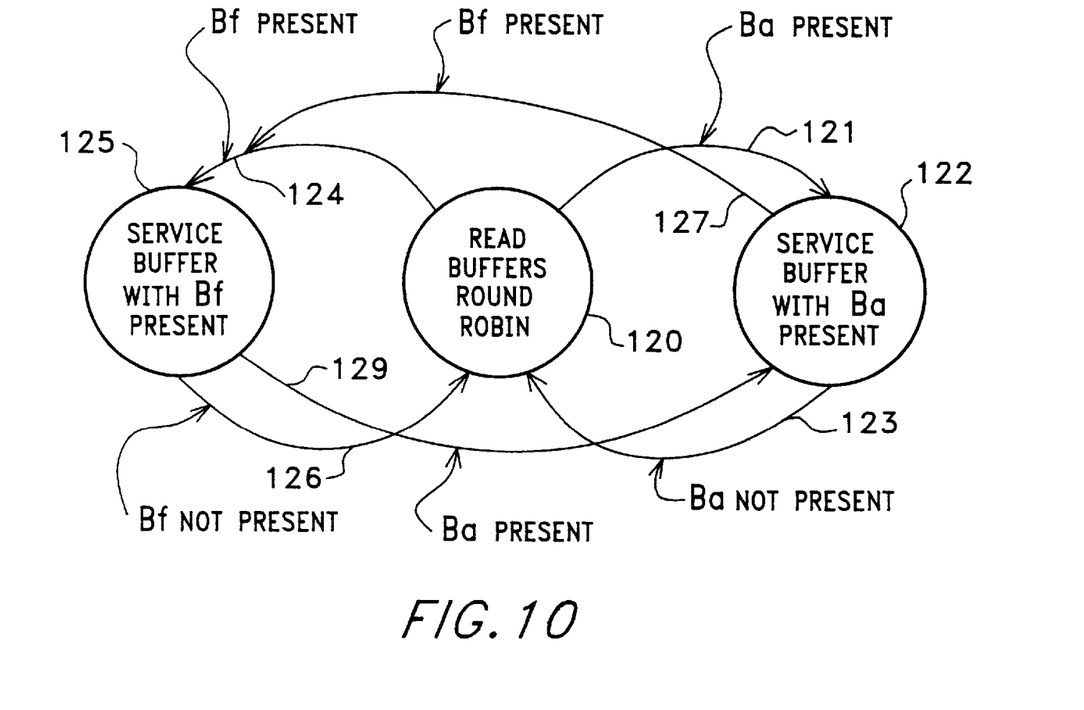
FIG. 10 is a state diagram showing the operation of the multiplexer of FIG. 8 in order to service the data that is within the multiplexer's buffers in a prioritized manner.
Figure 11:
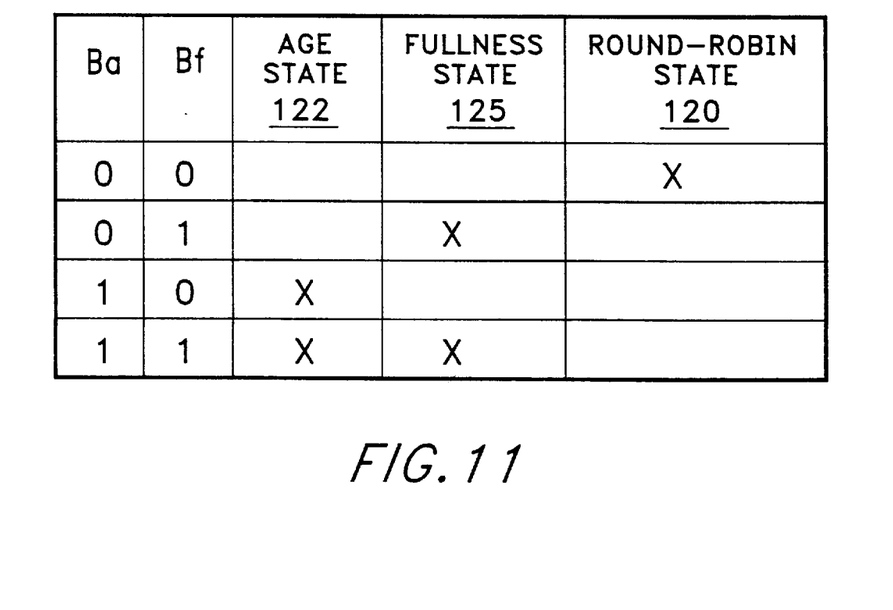
FIG. 11 is a truth table that shows the various modes of operation of the multiplexer of FIG. 8 and the state diagram of FIG. 10.

FIG. 10 is a state diagram showing the operation of multiplexer 80 of FIG. 8 in order to achieve the servicing of the data 43–47 within buffers 93–97 in the prioritized manner that is above described. FIG. 11 is a truth table that shows the various modes of operation of the multiplexer of FIG. 8 and the state diagram of FIG. 10.

The initial state of multiplexer 80 is indicated in FIG. 10 as state 120, i.e. a state in which buffers 93–97 are cyclically read in a repeating round robin manner from buffer 93 to buffer 97. In this initial state 120, no individual buffer 93–97 has exceeded its state-of-fullness threshold 113 (i.e. signal 114,Bf is not present for any one of the buffers 93–97), and no individual buffer 93–97 has exceeded its tolerance to transmission delay 117 (i.e., the age signal 111 for no buffer 93–97 has exceeded that buffer's tolerance to delay signal 117).

Considering state path 121, this state path is activated when the age signal 111,Ba of any of the buffers 93–97 becomes active. This condition is indicated in FIG. 9 as being the condition wherein one or more of the buffers 93–97 provides an age output signal 111 that is greater-than (or equal-to) that buffer's tolerance to delay threshold 117. When this condition occurs, age state 122 is enabled to service or read the data queue(s) of that buffer(s). Data queue reading condition 122 continues until the age 111 of the data that is in all of the buffers 93–97 no longer exceeds any of the tolerance to delay threshold signals 117, whereupon state path 123 is activated to return multiplexer 80 to initial round robin state 120.

Considering state path 124, this state path is activated when the buffer fullness signal 114,Bf of any buffer 90–97 becomes active. This condition is indicated in FIG. 9 as being the condition wherein any buffer 93–97 provides an output signal 114,Bf that indicates that the buffer is relatively full as compared to its threshold signal 113, for example 60% full for buffer 93, and/or 75% full for buffer 97.

When this condition occurs, fullness state 125 is enabled to service or read the data queue of that buffer(s). Data queue reading condition 125 now continues until the state of fullness signal 110 no longer equals or exceeds that buffer's threshold signal 113, whereupon state path 126 is activated to return to multiplexer 80 to initial round robin state 120.

As shown in FIG. 10, during operation of age state 122, it is possible that another buffer(s) 93–97 that did not operate to invoke age state 122 will become too-full, i.e. the 114,Bf signal of the another-buffer(s) becomes active. When this condition occurs, state path 127 operates to invoke fullness state 125, and to thereby additionally service the data queue of the another buffer(s), as both age state 122 and fullness 125 are active to service the related buffers 93–97.

In addition, and as shown in FIG. 10, during operation of fullness state 125, it is possible that the age signal 111 of the data that is queued by another buffer(s) 93–97 that did not operate to invoke fullness state 125 will become too-old in relation to the another-buffer(s) threshold signal 117. When this condition occurs, state path 129 operates to invoke age state 122, and to thereby additionally service the data queue of the another-buffer(s), as both age state 122 and fullness state 125 are active to service the related buffers 93–97.

This invention has been described in detail while making reference to various embodiments thereof. Since it is appreciated that those skilled in the art will, upon learning of this invention, readily visualize yet other embodiments that are within the spirit and scope of this invention, this detailed description should not be taken as a limitation on the spirit and scope of this invention.

What is claimed is:

1. A method of maximizing bandwidth utilization of a cable TV system forward data channel that has a fixed bandwidth, said forward data channel being used to transmit the number X of high priority data messages and the number Y of lower priority data messages to a plurality of set-top terminals that are located within said cable TV system, comprising the steps of:

providing high priority transmission means for the transmission of said number X of high priority data messages over a portion of said forward data channel at a continuous bit rate;

providing the number Y of data buffers, each of said data buffers for receiving a different one of said number Y of lower priority data messages;

each of said data buffers providing a fullness output signal that is representative of a state of buffer fullness;

providing the number Y of buffer fullness reference values, one fullness reference value being provided for each different one of said number Y of data buffers;

providing the number Y of fullness comparison means, each of said fullness comparison means receiving as a first input a fullness output signal from a data buffer and receiving as a second input a corresponding buffer fullness reference value, and each of said fullness comparison means providing an output based upon a comparison of said first and second inputs;

each of said data buffers providing a data age output signal that is representative of how long data has resided in a corresponding data buffer;

providing the number Y of data age reference values, one data age reference value being provided for each different one of said number Y of lower priority data messages;

providing a plurality Y of data age comparison means, each of said data age comparison means receiving as a first input a data age output signal from a data buffer and receiving as a second input a corresponding data age reference value, and each of said data age comparison means providing an output based upon a comparison of said first and second inputs;

providing priority establishing means operating to utilize said high priority transmission means to provide for the selective transmission of said number Y of lower priority data messages at an available bit rate, wherein a priority of transmission of individual ones of said number Y of lower priority data messages is based upon said outputs of said fullness comparison means and said outputs of said data age comparison means; and in the absence of any fullness output signal exceeding a corresponding buffer fullness reference value, and in the absence of any data age output signal exceeding a corresponding data age reference value, transmitting data contained in said number Y of data buffers in a round robin manner and at said available bit rate utilizing said high priority transmission means.

2. The method of claim 1 including the step of:

selecting said number Y of buffer fullness reference values and said number Y of data age reference values in a manner to achieved a desired priority ranging among said number Y of lower priority data items.

* * * * *